June 16, 1964 E. G. BAKER Re. 25,601
SWIMMING AID
Original Filed Jan. 28, 1959
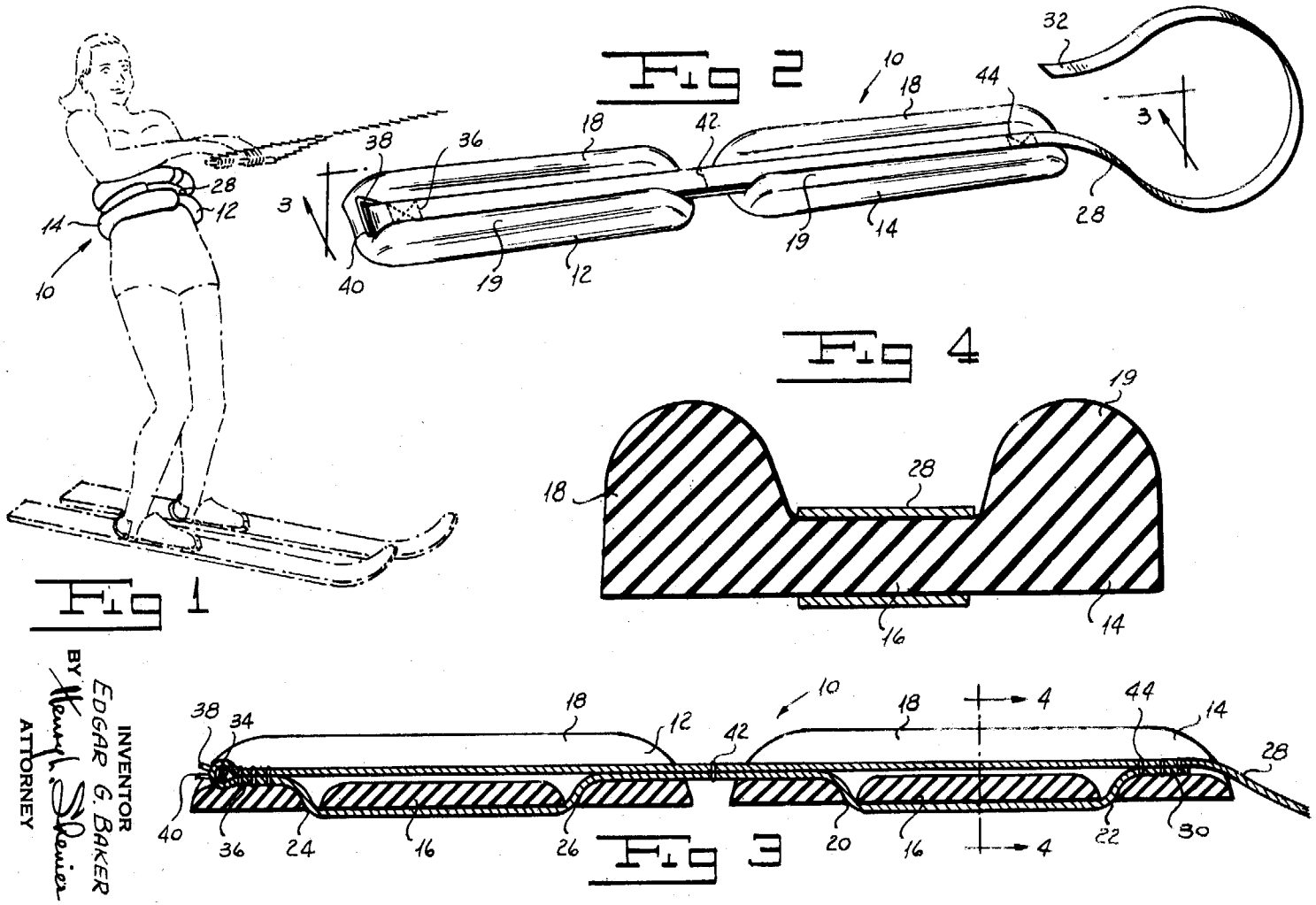
INVENTOR
EDGAR G. BAKER
BY Henry L. Shenier
ATTORNEY United States Patent Office Re. 25,601
Reissued June 16, 1964

25,601
SWIMMING AID

Edgar G. Baker, Lackawanna, Pa., assignor to Gentex Corporation, New York, N.Y., a corporation of Delaware Original No. 3,049,735, dated Aug. 21, 1962, Ser. No. 789,657, Jan. 28, 1959. Application for reissue July 31, 1963, Ser. No. 300,125
7 Claims. (Cl. 9—337)

Matter enclosed in heavy brackets [ ] appears in the original patent but forms no part of this reissue specification; matter printed in italics indicates the additions made by reissue.

My invention relates to a swimming aid which is light, compact, comfortable, and durable and more particularly to a swimming aid which is particularly adapted for use by persons engaged in aquatic sports.

Aquatic sports, such as water skiing, aquaplaning and the like, have become extremely popular. Inherent in participation in sports of this nature is the danger that the rider or skier may fall from the skis or the like while traveling over deep water at some distance from the shore. It is desirable for the safety of the skier that, even if he be an expert swimmer, he should be provided with some assistance in remaining afloat until he can reach shore or until he is picked up by the towing boat.

Many forms of life preservers are known in the prior art. For the most part, these devices are bulky, cumbersome, and uncomfortable. They do not permit the wearer sufficient freedom of movement for him to engage freely in active sports, such as water skiing and the like. These preservers of the prior art are not intended for repeated use but are intended only for emergency use. They are not constructed to withstand the shocks and abuse incident to everyday athletic use. The buoyancy of these bulky preservers of the prior art is many times greater than that which is necessary merely to assist a swimmer in staying afloat for a sufficient time to permit him to reach safety. Owing to their bulk and manner of construction, these life preservers of the prior art are unsuitable for use by a person engaging in active water sports.

I have invented a comfortable and compact swimming aid which reduces the effort required in swimming while affording the wearer great freedom of movement when engaged in active water sports. My swimming aid assists a fallen water skier or like person in remaining afloat until he reaches safety. My device can withstand the abuse incident to its use by a person regularly engaged in active sports.

One object of my invention is to provide a swimming aid which is especially adapted for use by a person engaged in active aquatic sports, such as water skiing and the like.

Another object of my invention is to provide a swimming aid which is less bulky than are life preservers of the prior art.

A further object of my invention is to provide a swimming aid which is less cumbersome than are life preservers of the prior art.

Still another object of my invention is to provide a swimming aid which is durable to permit its repeated use by a person engaging in active water sports.

Yet another object of my invention is to provide a swimming aid which reduces the effort required for swimming.

Other and further objects of my invention will appear from the following description:

In general my invention contemplates the provision of a swimming aid having a pair of molded elongated channel-shaped floats. I provide the bases of the floats with spaced openings to permit a length of webbing to be passed through the openings to form a belt by means of which my swimming aid may be secured firmly and comfortably around the waist of the wearer.

In the accompanying drawings which form part of the instant specification and which are to be read in conjunction therewith and in which like reference numerals are used to indicate like parts in the various views:

FIGURE 1 is a perspective view illustrating my swimming aid in use by a water skier.

FIGURE 2 is a perspective view of my swimming aid when detached from the body of the wearer.

FIGURE 3 is a sectional view of my swimming aid taken along the line 3—3 of FIGURE 2 and drawn on an enlarged scale.

FIGURE 4 is a sectional view of my swimming aid taken along the line 4—4 of FIGURE 3 and drawn on an enlarged scale.

Referring now more particularly to the drawings, my swimming aid, indicated generally by the reference character 10, includes a pair of floats 12 and 14, which are molded from a suitable material such, for example, as foam rubber or the like. I form the elongated floats 12 and 14 with a channel-shaped cross section to provide each float with a base 16 and sides 18 and 19. I provide the base 16 of the float 14 with a pair of spaced openings 20 and 22. The base 16 of the float 12 has a pair of openings 24 and 26 formed therein.

A length of webbing 28, made of any suitable material such as cotton, nylon or the like, forms the belt of my swimming aid. Beginning with the end 30 of the length of webbing 28 remote from the free end 32, I pass the webbing through the opening 22 in the base 16 of the float 14 and along the flat underside of the base of float 14 to the opening 20. I next pass the length of webbing 28 upwardly through the opening 20. The webbing next passes through the opening 26, then along the flat underside of the base 16 of float 12 and upwardly through the opening 24.

I form a loop 34 in the belt and retain the loop in the belt by stitching 30 or by any other appropriate means. The loop 34 retains a pair of rectangular members 38 and 40, forming the buckle of my swimming aid on the belt. I pass the length of webbing 28 back through the channels of floats 12 and 14 to leave a free end 32, which may be secured by the buckle made up of members 38 and 40 to retain the swimming aid on the wearer's body in a manner to be described. Stitching 42 secures the length of webbing 28 passed back through the channels of the floats 12 and 14 to the portion of the length of webbing extending along the channels between openings 20 and 26. Stitching 44 secures the length of webbing 28 extending back through the channels of the floats 12 and 14 to the end 30 to hold the floats 12 and 14 firmly on the belt. This manner of assembling the floats to the belt of my swimming aid enables the device to withstand severe abuse without damaging the floats.

In use of my swimming aid, a water skier or a person engaged in any other water sport of a similar nature wraps the floats 12 and 14 around his waist and passes the free end 32 of belt 28 through both members 38 and 40. The free end then is looped around the member 38 and is passed through the member 40 to cinch the swimming aid tightly about the waist of the wearer as tension is exerted on the free end of the belt. It will be appreciated that when the swimming aid is drawn around the waist of the wearer as shown in FIGURE 1, the flat undersides of the floats 12 and 14 conform themselves to the wearer's body. The portions of the flat webbing belt 28 extending along the undersides of the floats 12 and 14 between the pairs of openings 20 and 22 and 24 and 26 permit this action without discomfort to the wearer. My swimming aid is thus secured tightly to the wearer's body in a position in which it cannot interfere with his activity. At the same time it is extremely comfortable with the result that the user is scarcely aware of the presence of the aid. These results are accomplished by my swimming aid while permitting it to withstand great abuse in repeated uses without the danger of damage. It will be readily apparent that, owing to the elongated channel shape of my buoyant members and to the fact that the belt is disposed in the channels of the members over an appreciable portion of their length, the buoyant members are securely held on the wearer's person in the position they are intended to occupy. They will not readily become disarranged with respect to the belt, even when subjected to shock as when the wearer takes a heavy fall into the water. Should the person wearing the aid fall or be thrown from the water skis or the like, my swimming aid affords him sufficient buoyancy to remain afloat until he reaches what may be a relatively distant shore or until he is picked up by the towing boat.

It will be seen that I have accomplished the objects of my invention. I have provided a swimming aid which is light, compact, and comfortable. My swimming aid does not interfere with the activity of the wearer and thus is especially adapted for use by a person engaging in an active sport, such as water skiing or the like. My swimming aid reduces the effort required in swimming and provides sufficient buoyancy to permit the user to stay afloat until he reaches safety. My aid can withstand great abuse in repeated uses.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A swimming aid including in combination a pair of elongated channel-shaped buoyant masses, each having its channel extending in the direction of its length to form a base, a belt and respective loops in said [belts] *belt* extending around said bases for retaining said masses in end-to-end relationship, portions of said belt loops lying in the channels of said masses on said bases for an appreciable portion of the lengths of said masses whereby to restrain said masses against shifting laterally of said belt.

2. A swimming aid including in combination a pair of elongated buoyant masses, each formed with a channel having its channel extending in the direction of its length to form a base formed with a pair of spaced openings, a belt disposed in the channels of said masses and respective loops in said belt surrounding the portions of said bases between said spaced openings, portions of said belt loops lying in the channels of said masses on said bases for an appreciable portion of the lengths of said masses whereby to restrain said masses against shifting laterally of the belt.

3. A swimming aid including in combination a pair of elongated channel-shaped floats, each float having its channel extending in the direction of its length, means forming pairs of spaced openings in said floats to define respective float portions extending between the openings of said [pair] *pairs* of spaced openings, a belt, and respective loops in said belt surrounding the portions of said floats between said pairs of openings, portions of said belt loops lying in the channels of said floats between said openings whereby to restrain said floats against shifting laterally of the belt length.

4. A swimming aid including in combination a pair of channel-shaped floats, each of said floats having its channel extending in the direction of its length to form a base, means forming a pair of spaced openings in each base to define respective base portions extending between the openings of said pairs of spaced openings, a belt and respective loops formed in said belt around the portions of said bases between said pairs of openings, portions of said belt loops lying in the portions of said channels between the openings of each pair and on said bases whereby to restrain said floats against shifting laterally of said belt.

5. A swimming aid as in claim 1 in which said belt is formed from flat webbing.

*6. A swimming aid including in combination a channel shaped float, said float having its channel extending in the direction of its length to form a base, means forming a pair of spaced openings in the base to define a base portion extending between the openings of said pair of spaced openings, a belt and a loop formed in said belt around the portion of said base between said pair of openings, a portion of said belt loop lying in the portion of said channel between the openings of the pair and on said base whereby to restrain said float against shifting laterally of said belt.*

*7. A swimming aid including in combination a channel shaped float, said float having its channel extending in the direction of its length to form a base, means forming a pair of spaced openings in the base to define a base portion extending between the openings of said pair of spaced openings, a belt of flat webbing and a loop formed in said belt around the portion of said base between said pair of openings, a portion of said belt loop lying in the portion of said channel between the openings of the pair and on said base whereby to restrain said float against shifting laterally of said belt.*

References Cited in the file of this patent or the original patent

UNITED STATES PATENTS

| | | |
|---|---|---|
| 832,999 | Petrie et al. | Oct. 9, 1906 |
| 1,212,315 | Bjerre | Jan. 16, 1917 |
| 1,236,310 | Johnson | Aug. 7, 1917 |
| 1,341,529 | Watts | May 25, 1920 |
| 1,367,225 | Barker | Feb. 1, 1921 |
| 1,492,041 | Long | Apr. 29, 1924 |

FOREIGN PATENTS

| | | |
|---|---|---|
| 6,174 | Great Britain | 1893 |
| 14,072 | Great Britain | Sept. 28, 1916 |
| 114,169 | Great Britain | Mar. 28, 1918 |
| 787,154 | France | June 24, 1935 |
| 888,288 | France | Aug. 30, 1943 |